United States Patent
Qu et al.

(10) Patent No.: US 12,069,023 B2
(45) Date of Patent: Aug. 20, 2024

(54) DOMAIN NAME SYSTEM SERVICES FOR VARIABLE-LENGTH ADDRESS NETWORKS

(71) Applicant: Huawei Technologies Co., Ltd., Shenzhen (CN)

(72) Inventors: Yingzhen Qu, Plano, TX (US); Haoyu Song, Plano, TX (US); Michael McBride, Plano, TX (US); James N. Guichard, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/991,247

(22) Filed: Nov. 21, 2022

(65) Prior Publication Data

US 2023/0083671 A1    Mar. 16, 2023

Related U.S. Application Data

(63) Continuation of application No. PCT/US2021/031765, filed on May 11, 2021.
(Continued)

(51) Int. Cl.
*H04L 61/4511* (2022.01)
*H04L 61/4517* (2022.01)
(Continued)

(52) U.S. Cl.
CPC ...... *H04L 61/4511* (2022.05); *H04L 61/4517* (2022.05); *H04L 61/4523* (2022.05); *H04L 61/5007* (2022.05)

(58) Field of Classification Search
CPC . H04L 61/4511; H04L 61/5007; H04L 61/50; H04L 61/5014; H04L 61/5076;
(Continued)

(56) References Cited

U.S. PATENT DOCUMENTS

| | | | |
|---|---|---|---|
| 7,188,138 B1 * | 3/2007 | Schneider | G06Q 30/02 |
| | | | 709/224 |
| 9,197,485 B1 * | 11/2015 | Breau | H04W 8/04 |

(Continued)

FOREIGN PATENT DOCUMENTS

| | | | |
|---|---|---|---|
| AU | 2006245467 A1 * | 12/2007 | ............. H04W 48/08 |
| AU | 2009201049 A1 * | 4/2009 | ......... G06F 16/9537 |
| WO | 2020168363 A2 | 8/2020 | |

OTHER PUBLICATIONS

Song, H., et al., "Adaptive Addresses for Next Generation IP Protocol in Hierarchical Networks," 2020 IEEE 28th International Conference on Network Protocols (ICNP), Oct. 13, 2020, 6 pages.
(Continued)

*Primary Examiner* — Khanh Q Dinh
(74) *Attorney, Agent, or Firm* — Conley Rose, P.C.

(57) ABSTRACT

A DNS server comprises: a receiver configured to receive a registration request comprising a domain name, a local address, and a scope, the registration request requests registration of the domain name; a processor coupled to the receiver and configured to execute computer instructions that cause the processor to: assign an address to the domain name based on the local address and the scope, and generate a registration response comprising the address; and a transmitter coupled to the processor and configured to transmit the registration response towards an endpoint. The processor may be further configured to cache a correspondence among the domain name, the address, and the scope.

20 Claims, 5 Drawing Sheets

Related U.S. Application Data (60) Provisional application No. 63/028,363, filed on May 21, 2020.

(51) Int. Cl.
*H04L 61/4523* (2022.01)
*H04L 61/5007* (2022.01)

(58) Field of Classification Search
CPC ............. H04L 61/4517; H04L 61/4523; H04L 61/4535; H04L 61/5046; H04L 61/58
USPC ................. 709/220, 224, 226, 228, 203, 245
See application file for complete search history.

(56) References Cited

U.S. PATENT DOCUMENTS

| | | | |
|---|---|---|---|
| 9,407,571 B1* | 8/2016 | Breau | ................... H04W 8/04 |
| 9,531,581 B1* | 12/2016 | Adkins, III | ......... H04L 61/3025 |
| 11,244,368 B1* | 2/2022 | Sitowitz | ............ G06Q 30/0611 |
| 11,570,278 B1* | 1/2023 | Uthaman | ........... H04L 41/0894 |
| 11,641,410 B1* | 5/2023 | Uthaman | ................ H04L 43/50 |
| | | | 709/218 |
| 11,658,995 B1* | 5/2023 | Arora | .................... H04L 63/101 |
| | | | 726/23 |
| 2006/0258356 A1* | 11/2006 | Maxwell | ................. H04L 61/45 |
| | | | 455/436 |
| 2007/0266141 A1* | 11/2007 | Norton | .................... H04L 61/30 |
| | | | 709/224 |
| 2008/0016233 A1* | 1/2008 | Schneider | ........... H04L 61/4511 |
| | | | 709/230 |
| 2008/0235383 A1* | 9/2008 | Schneider | ............... H04L 61/30 |
| | | | 709/229 |
| 2009/0316670 A1* | 12/2009 | Grandham | ............ H04W 74/02 |
| | | | 370/352 |
| 2015/0195299 A1* | 7/2015 | Zoldi | .................. H04L 63/1408 |
| | | | 726/25 |
| 2016/0381149 A1* | 12/2016 | Bjornson | ............ H04L 41/0883 |
| | | | 709/217 |
| 2018/0006912 A1* | 1/2018 | Sokolik | .................... G06F 16/22 |
| 2018/0013789 A1* | 1/2018 | Damian | ............. H04L 63/0236 |
| 2018/0343229 A1* | 11/2018 | Labrou | ............... H04L 63/1458 |
| 2019/0036708 A1* | 1/2019 | Fregly | ..................... H04W 4/02 |
| 2019/0081925 A1* | 3/2019 | Gottlieb | ................. H04L 45/02 |
| 2019/0149449 A1* | 5/2019 | Morris | .................... H04L 45/22 |
| | | | 709/245 |

OTHER PUBLICATIONS

Pillai, S., "Iterative VS Recursive DNS," Retrieved from the Internet: https://www.slashroot.in/difference-between-iterative-and-recursive-dns-query, Jan. 12, 2013, 6 pages.

Cheshire, S., et al., "Service Registration Protocol for DNS-Based Service Discovery," draft-ietf-dnssd-srp-02, Jul. 8, 2019, 27 pages.

Bagnulo, M., et al., "DNS64: DNS Extensions for Network Address Translation from IPv6 Clients to IPv4 Servers," RFC 6147, Apr. 2011, 32 pages.

Hardaker, W., "Requirements for Management of Name Servers for the DNS," RFC 6168, May 2011, 17 pages.

Damas, J., et al., "Extension Mechanisms for DNS (EDNS(0))," RFC 6891, Apr. 2013, 16 pages.

Contavalli, C., et al., "Client Subnet in DNS Queries," RFC 7871, 30 pages.

* cited by examiner

DOMAIN NAME SYSTEM SERVICES FOR VARIABLE-LENGTH ADDRESS NETWORKS

CROSS-REFERENCE TO RELATED APPLICATIONS

This is a continuation of Int'l Patent App. No. PCT/US2021/031765 filed on May 11, 2021, which claims priority to U.S. Prov. Patent App. No. 63/028,363 filed on May 21, 2020, both of which are incorporated by reference.

TECHNICAL FIELD

The disclosed embodiments relate to DNS in general and Domain Name System (DNS) services for Variable-Length Address (VLA) networks in particular.

BACKGROUND

IPvn is a protocol that defines Internet services for a VLA network. The VLA network comprises domains organized in a hierarchical structure so that there is one top-level domain, first-level domains in the top-level domain, second-level domains in the first-level domains, and so on. Entities in the same domain communicate using local addresses. However, entities in different domains communicate using addresses that comprise the local addresses, as well as domain addresses of shared higher-level domains. Those domain addresses may be prepended or appended to the local addresses. That variation in address length provides for a greater number of addresses available in each domain. In addition, packet headers can use smaller addresses, particularly within lower-level domains, which decreases packet processing time and conserves device power.

SUMMARY

A first aspect relates to a DNS server comprising: a receiver configured to receive a registration request comprising a domain name, a local address, and a scope, the registration request requests registration of the domain name; a processor coupled to the receiver and configured to execute computer instructions that cause the processor to: assign an address to the domain name based on the local address and the scope, and generate a registration response comprising the address; and a transmitter coupled to the processor and configured to transmit the registration response towards an endpoint.

In the embodiments, one DNS server is located in each domain. In this context, a domain is defined as a collection of networked entities that operate common routing protocols, are under control of a single administration, and have the same address length. Entities include devices, services, and other resources. The devices include endpoints, web servers, routers, and DNS servers. Each DNS server knows its address and knows addresses, and thus prefixes, of domains above its domain. For DNS registration, a web server registers its domain name with a highest-level DNS server at the highest-level domain that is allowed or with a local DNS server in its own domain. In the latter case, the local DNS server either immediately reports its registration to higher-level DNS servers all the way up to the highest-level DNS server or does so upon receiving a query. For DNS querying, like in other DNS services, a host initiates recursive querying in which the DNS server performs most of the work or iterative querying in which the host performs most of the work. However, unlike other DNS services, the host transmits a query either to the highest-level DNS server or the local DNS server. Though correspondences, or mappings, among domain names, addresses, and scopes are discussed, similar concepts may apply to other DNS services or to other non-DNS services.

Optionally, in any of the preceding aspects, the domain name is a name of a website.

Optionally, in any of the preceding aspects, the local address is of a web server that stores, processes, and delivers the website.

Optionally, in any of the preceding aspects, the scope defines domains that can access the website.

Optionally, in any of the preceding aspects, the scope is an address length.

Optionally, in any of the preceding aspects, the address length is 8 bits, 16 bits, or 24 bits.

Optionally, in any of the preceding aspects, the DNS server is in a domain, wherein the endpoint is in a sub-domain of the domain, and wherein the address comprises a domain address of the sub-domain.

Optionally, in any of the preceding aspects, the DNS server is in a domain, wherein the endpoint is in the domain, and wherein the address comprises no domain address.

Optionally, in any of the preceding aspects, the processor is further configured to execute the computer instructions that cause the processor to cache a correspondence among the domain name, the address, and the scope.

A second aspect relates to a method implemented by a DNS server and comprising: receiving a registration request comprising a domain name, a local address, and a scope, the registration request requests registration of the domain name; assigning an address to the domain name based on the local address and the scope; generating a registration response comprising the address; and transmitting the registration response towards an endpoint.

Optionally, in any of the preceding aspects, the domain name is a name of a website.

Optionally, in any of the preceding aspects, the local address is of a web server that stores, processes, and delivers the website.

Optionally, in any of the preceding aspects, the scope defines domains that can access the website.

Optionally, in any of the preceding aspects, the scope is an address length.

Optionally, in any of the preceding aspects, the address length is 8 bits, 16 bits, or 24 bits.

Optionally, in any of the preceding aspects, the DNS server is in a domain, wherein the endpoint is in a sub-domain of the domain, and wherein the address comprises a domain address of the sub-domain.

Optionally, in any of the preceding aspects, the DNS server is in a domain, wherein the endpoint is in the domain, and wherein the address comprises no domain address.

Optionally, in any of the preceding aspects, the method further comprises caching a correspondence among the domain name, the address, and the scope.

A third aspect relates to an endpoint comprising: a processor configured to execute computer instructions that cause the processor to generate a query comprising a domain name and a scope, the domain name is a name of a website, the scope defines domains in which the query is valid, and the query requests an address corresponding to the domain name; and a transmitter coupled to the processor and configured to transmit the query towards a Domain Name System server.

A fourth aspect relates to a method implemented by an endpoint and comprising: generating a query comprising a domain name and a scope, the domain name is a name of a website, the scope defines domains in which the query is valid, and the query requests an address corresponding to the domain name; and transmitting the query towards a Domain Name System server.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations apply:
AS: autonomous system
ASIC: application-specific integrated circuit
CPU: central processing unit
DNS: Domain Name System
DNSEXT: DNS Extensions
DSP: digital signal processor
EO: electrical-to-optical
FPGA: field-programmable gate array
IESG: Internet Engineering Steering Group
IPv4: Internet Protocol version 4
IPv6: Internet Protocol version 6
IPvn: Internet Protocol version n
OE: optical-to-electrical
RAM: random-access memory
RF: radio frequency
RFC: request for comments
ROM: read-only memory
RX: receiver unit
SRAM: static RAM
TCAM: ternary content-addressable memory
TX: transmitter unit
VLA: variable-length address.

DNS provides naming services for entities in networks. The entities register their names with servers, and the servers assign addresses to the names. When other entities query those names, the servers respond with corresponding addresses. The addresses are 32 bits in IPv4, 128 bits in IPv6, and of variable length in IPvn. New DNS services are needed to support the VLAs in VLA networks such as IPvn.

Disclosed herein are embodiments for DNS services for VLA networks. In the embodiments, one DNS server is located in each domain. In this context, a domain is defined as a collection of networked entities that operate common routing protocols, are under control of a single administration, and have the same address length. Entities include devices, services, and other resources. The devices include endpoints, web servers, routers, and DNS servers. Each DNS server knows its address and knows addresses, and thus prefixes, of domains above its domain. For DNS registration, a web server registers its domain name with a highest-level DNS server at the highest-level domain that is allowed or with a local DNS server in its own domain. In the latter case, the local DNS server either immediately reports its registration to higher-level DNS servers all the way up to the highest-level DNS server or does so upon receiving a query. For DNS querying, like in other DNS services, a host initiates recursive querying in which the DNS performs most of the work or iterative querying in which the host performs most of the work. However, unlike other DNS services, the host transmits a query either to the highest-level DNS server or the local DNS server. Though correspondences, or mappings, among domain names, addresses, and scopes are discussed, similar concepts may apply to other DNS services or to other non-DNS services.

Figure 1:
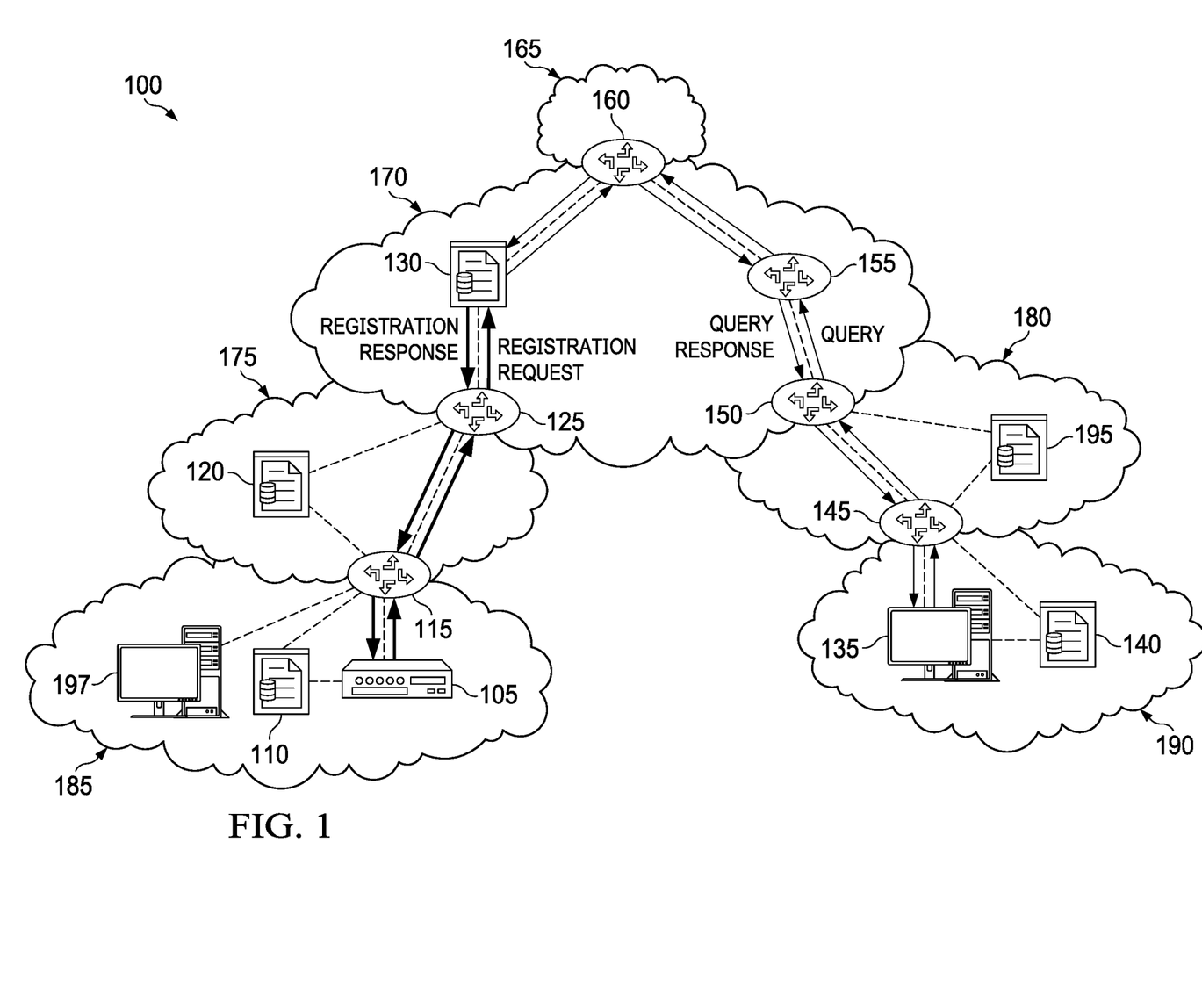
FIG. 1 is a schematic diagram of a VLA network demonstrating top-down DNS registration and demonstrating DNS querying.

FIG. 1 is a schematic diagram of a VLA network 100 demonstrating top-down DNS registration and demonstrating DNS querying. The VLA network 100 comprises an IPv6 domain 165 and domains 170, 175, 180, 185, 190. Among the domains 170, 175, 180, 185, 190, the domain 170 is a top-level domain for IPvn, the domains 175, 180 are first-level domains, and the domains 185, 190 are second-level domains.

The VLA network 100 is denoted with "VLA" because the IPv6 domain 165 uses 128-bit addresses and the domains 170, 175, 180, 185, 190 use smaller addresses. For instance, the domain 170 uses 24-bit addresses; the domains 175, 180 use 16-bit addresses; and the domains 185, 190 use 8-bit addresses. Other address lengths below 128 bits, or address lengths specified by other protocols, are also possible. For instance, 64 bits, 32 bits, and 4 bits are also possible.

The domains 170, 175, 180, 185, 190 collectively comprise a web server 105; DNS servers 110, 120, 130, 140, 195; routers 115, 125, 145, 150, 155, 160; and endpoints 135, 197. The web server 105 stores, processes, and delivers a domain, or webpage or website. The DNS servers 110, 120, 130, 140, 195 provide DNS services. The DNS servers 110, 120, 140, 195 are local DNS servers for entities in their respective domains 175, 180, 185, 190. The DNS server 130 is a top-level DNS server for IPvn. Though the domains 170, 175, 180, 185, 190 are shown as respectively comprising one DNS server 130, 120, 195, 110, 140, the domains 170, 175, 180, 185, 190 may comprise multiple DNS servers to provide redundancy in case of a DNS server failure. The routers 115, 125, 145, 150, 155, 160 forward packets among entities. The router 115 is a gateway for the domain 185, the router 125 is a gateway for the domain 175, the router 160 is a gateway for the domain 170, the router 150 is a gateway for the domain 180, and the router 145 is a gateway for the domain 190. The endpoints 135, 197 are mobile phones, computers, or other network-enabled devices associated with users.

For DNS registration, the web server 105 transmits a registration request towards the top-level DNS server, the DNS server 130, through the routers 115, 125. Because the web server 105 registers directly with the DNS server 130 without registering with lower-level DNS servers, the DNS registration is referred to as top-down registration. The registration request comprises a domain name, a local address, and a scope. The registration request requests registration of the domain name. The domain name is a name of a website that the web server 105 stores, processes, and delivers. For instance, the domain name is example.com. The local address is an address of the web server 105 for communicating with entities within the domain 185. For instance, the local address is 10. The scope defines domains that can access the website. The scope may define the domains by address length, domain name, or AS number. For instance, the scope is a 24-bit address length so that the domain 170, which uses 24-bit addresses, as well as all sub-domains of the domain 170, specifically the domains 175, 180, 185, 190, can access example.com. Implied in that ability is that all entities in the domains 170, 175, 180, 185, 190 can also access example.com. However, the IPv6 domain 165, which uses 128-bit addresses, cannot access example.com.

The registration request may indicate the scope in the format specified in J. Damas, et al., "Extension Mechanisms for DNS (EDNS(0))," RFC 6891, April 2013. That format provides for an option-code field, an option-length field, and an option-data field. The option-code field is assigned by the Expert Review process as defined by the DNSEXT working group and the IESG, the option-length field is the size in octets of the option-data field, and the option-data field varies per option code. For instance, the registration request indicates a 24-bit address length in the option-data field.

In response to the registration request, the DNS server 130 registers the domain name. Specifically, the DNS server 130 determines an address based on the local address and the scope. For instance, when the scope is an address length of 24 bits, the address comprises the local address of the web server 105 and prepends domain addresses of all domains below the domain 170, which uses 24-bit addresses. Specifically, the address prepends the domain addresses of the domains 175, 185. Thus, the address is 40-10-10, where 40 is the domain address of the domain 175, the middle 10 is the domain address of the domain 185, and the right 10 is the local address of the web server 105. The address is unique in the domain 170. The DNS server 130 generates a registration response comprising the address and transmits the registration response towards the web server 105 through the routers 125, 115. Finally, the DNS server 130 caches in a database a correspondence among the domain name, the address, and the scope.

In a first alternative, instead of 24 bits, the scope is an address length of 128 bits and the web server 105 registers with a DNS server in the IPv6 domain 165. Thus, the address is unique in the IPv6 domain 165 and comprises an address of 2001:40-10-10, where 2001 is the domain address of the IPv6 domain 165, 40 is the domain address of the domain 175, the middle 10 is the domain address of the domain 185, and the right 10 is the local address of the web server 105. In a second alternative, the scope is an address length of 16 bits. Thus, the address is unique in the domain 175 and comprises a domain address of the domain 185, or the address is unique in the domain 180 and comprises a domain address of the domain 190. In a third alternative, the scope is an address length of 8 bits. Thus, the address is unique in the domain 185 or the domain 190 and comprises no domain address.

For DNS querying, the endpoint 135 transmits a query to the local DNS server, the DNS server 140. The query comprises a domain name and a scope. The query requests an address corresponding to the domain name. For instance, the domain name is example.com. The scope defines domains in which the query is valid. The scope may define the domains by address length, domain name, or AS number. For instance, the scope is a 24-bit address length so that the query is valid in the domain 170, which uses 24-bit addresses, as well as all sub-domains of the domain 170, specifically the domains 175, 180, 185, 190. However, the query is not valid in the IPv6 domain 165, which uses 128-bit addresses. Thus, if example.com is not hosted in the domains 170, 175, 180, 185, 190, but is instead hosted in the IPv6 domain 165, then no address should be returned in response to the query. The query may indicate the scope in the format described above.

The DNS server 140 forwards the query towards a top-level DNS server. For instance, the scope is a 24-bit address length, which corresponds to the domain 170. Thus, the DNS server 140 forwards the query to the DNS server in the domain 170, specifically the DNS server 130, through the routers 145, 150, 155, 160. The DNS server 130 queries the database; finds the address corresponding to the domain name; generates a query response comprising the address; and transmits the query response towards the DNS server 140 through the routers 160, 155, 150, 145. For instance, the address is 40-10-10 as described above. The DNS server 140 caches in a database a correspondence between the domain name and the address. Finally, the DNS server 140 forwards the query response to the endpoint 135.

In a first alternative, the DNS server 140 does not directly forward the query towards the DNS server 130 through the routers 145, 150, 155, 160. Instead, the DNS server 140 forwards the query up one domain at a time. Thus, the DNS server 140 first forwards the query towards the DNS server 195 through the router 145, and the DNS server 195 then forwards the query towards the DNS server 130 through the routers 150, 155, 160. In a second alternative, the endpoint 197 transmits the query towards the DNS server 110 through the router 115, and the DNS server 110 transmits the query response towards the endpoint 197 through the router 115. The address in the query response is 10 instead of 40-10-10 because the query originates from the same domain that the DNS server 110 is in, making the addresses of the domains 185, 175 unneeded. In a third alternative, the scope is a 128-bit address length, so the endpoint 135 transmits the query to the DNS server 140, the DNS server 140 forwards the query to a DNS server in the IPv6 domain 165, the DNS server in the IPv6 domain 165 transmits a query response to the DNS server 140, and the DNS server 140 forwards the query response to the endpoint 135 and caches a correspondence between a domain name and an address.

Figure 2:
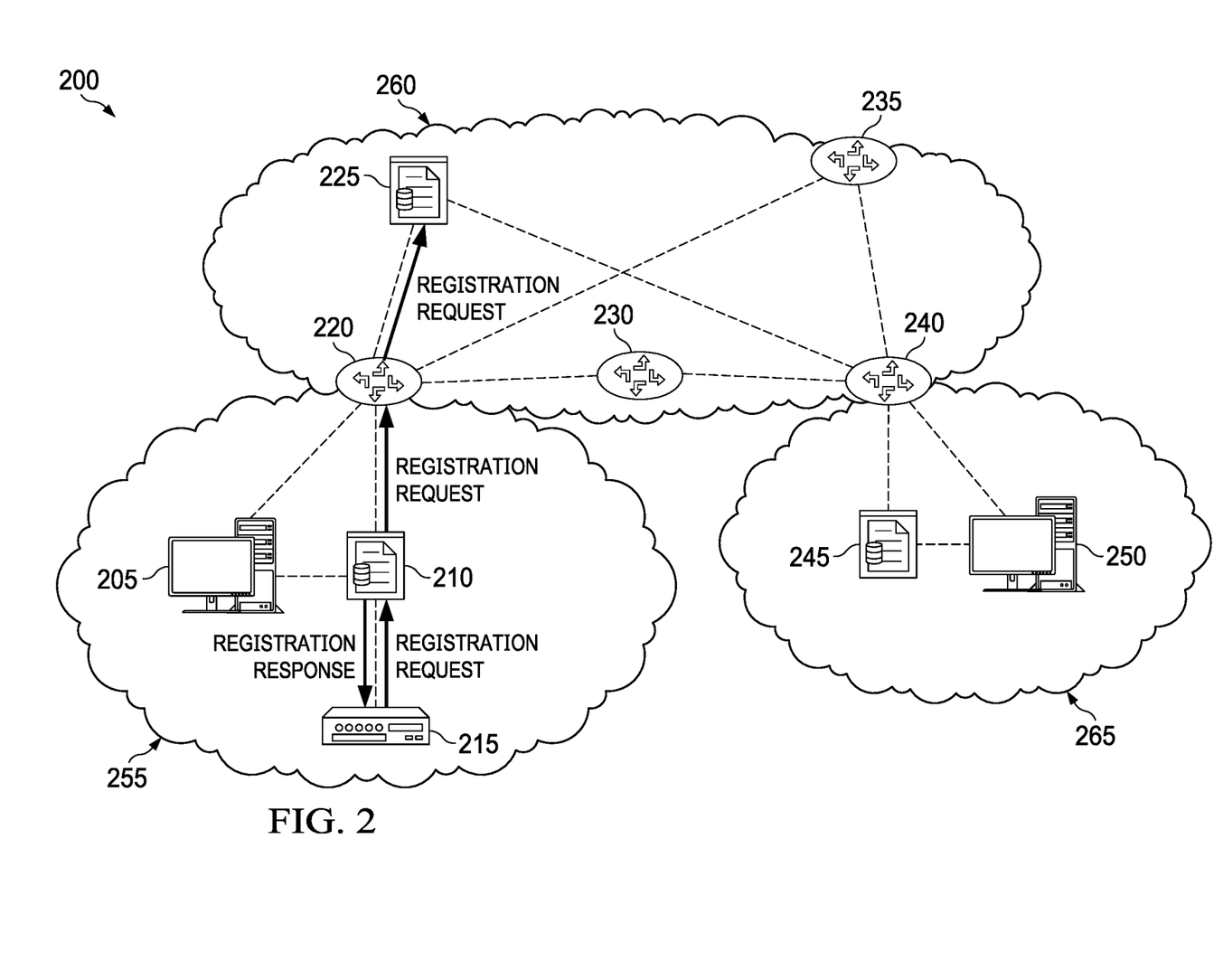
FIG. 2 is a schematic diagram of a VLA network demonstrating push DNS registration and demonstrating DNS querying.

FIG. 2 is a schematic diagram of a VLA network 200 demonstrating push DNS registration and demonstrating DNS querying. The VLA network 200 is similar to the VLA network 100, and the DNS registration and DNS querying described with respect to the VLA network 200 are similar to DNS registration and DNS querying described with respect to the VLA network 100. Specifically, the VLA network 200 comprises domains 255, 260, 265. Among the domains 255, 260, 265, the domain 260 is a top-level domain for IPvn and comprises the sub-domains 255, 265, which are first-level sub-domains. The domains 255, 260, 265 comprise endpoints 205, 250; DNS servers 210, 225, 245; a web server 215; and routers 220, 230, 235, 240.

For DNS registration, the web server 215 transmits a registration request to the DNS server 210 as described above. In response to the registration request, the DNS server 210 performs registration, generates a registration response, transmits the registration response to the web server 215, and caches in a database a correspondence among a domain name, an address, and a scope as described above. For instance, because the web server 215 and the DNS server 210 are in the same domain 255, the address is 10, which is the local address of the web server 215.

When a scope of the registration request indicates the domain 260, then the DNS server 225 is the top-level DNS server. Thus, the DNS server 210 forwards, or pushes, the registration request towards the DNS server 225 through the router 220. Because of this pushing, the DNS registration is referred to as push registration. In response to the registration request, the DNS server 225 generates a registration response, transmits the registration response to the DNS server 210, and caches in a database a correspondence among the domain name, an address, and a scope as described above. For instance, the address is 10-10, where the left 10 is a domain address of the domain 255 and the right 10 is the local address of the web server 215.

For DNS querying, when the endpoint 205 transmits a query to the DNS server 210, the DNS server 210 transmits to the host 205 a query response with the local address 10. When the endpoint 250 transmits a query towards the DNS server 225 through the DNS server 245 and the router 240, the DNS server 225 transmits towards the endpoint 250 through the DNS server 245 and the router 240 a query response with the address 10-10.

Figure 3:
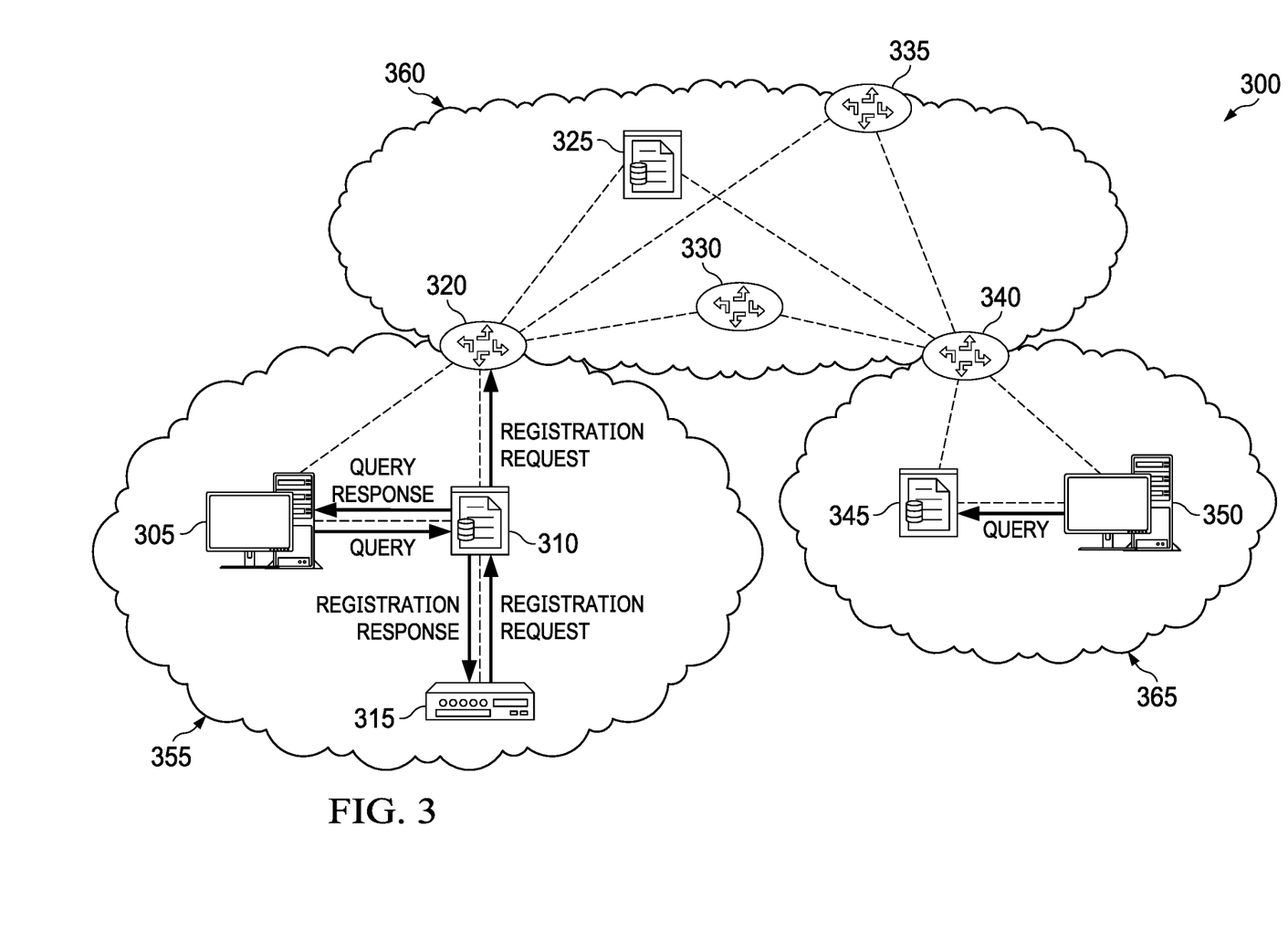
FIG. 3 is a schematic diagram of a VLA network demonstrating DNS registration and demonstrating pull DNS querying.

FIG. 3 is a schematic diagram of a VLA network 300 demonstrating DNS registration and demonstrating pull DNS querying. The VLA network 300 is similar to the VLA network 200, and the DNS registration and DNS querying described with respect to the VLA network 300 are similar to DNS registration and DNS querying described with respect to the VLA network 200. Specifically, the VLA network 300 comprises domains 355, 360, 365. The domains 355, 360, 365 comprise endpoints 305, 350; DNS servers 310, 325, 345; a web server 315; and routers 320, 330, 335, 340.

For DNS registration, the web server 315 transmits a registration request to the DNS server 310 as described above. In response to the registration request, the DNS server 310 performs registration, generates a registration response, transmits the registration response to the web server 315, and caches in a database a correspondence among a domain name, an address, and a scope as described above. For instance, the address is 10. However, the DNS server 310 does not forward, or push, the registration request towards the DNS server 325 through the router 320.

For DNS querying, when the endpoint 305 transmits a query to the DNS server 310, the DNS server 310 transmits to the host 305 a query response with the local address 10. When the endpoint 350 transmits a query towards the DNS server 325 through the DNS server 345 and the router 340, the DNS server 325 transmits towards the endpoint 350 and through the router 340 and the DNS server 345 a query response with the address 10-10, and the DNS server 345 caches a correspondence among the domain name, the address, and the scope. However, before the DNS server 325 transmits the query response, the DNS server 325 forwards the query towards the DNS server 310 through the router 320, the DNS server 310 transmits towards the DNS server 325 through the router 320 the query response with the address 10-10, and the DNS server 325 caches a correspondence among the domain name, the address, and the scope. Because the address is pulled from the DNS server 310 to the DNS server 325, the querying is referred to as pull querying.

Figure 4:
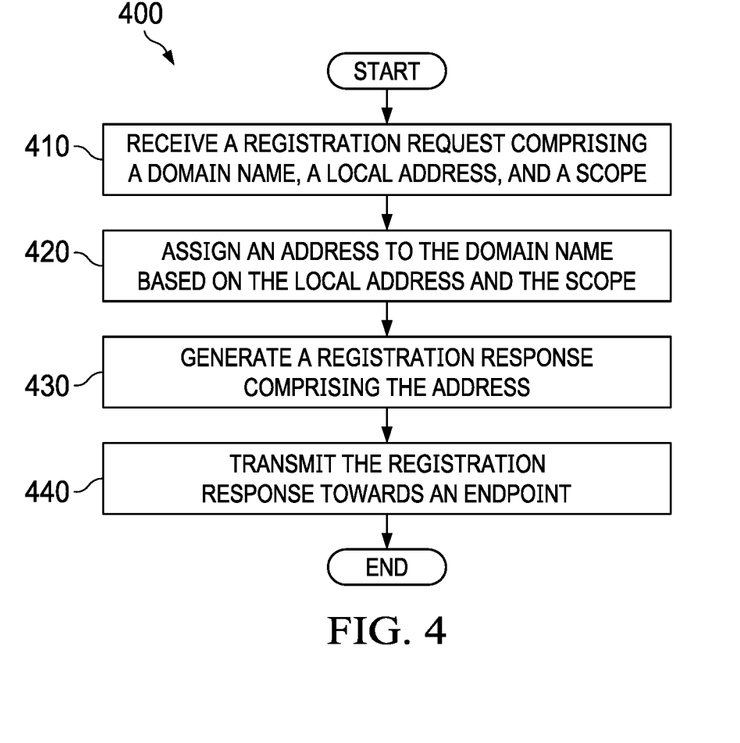
FIG. 4 is a flowchart illustrating a method of DNS registration.

FIG. 4 is a flowchart illustrating a method 400 of DNS registration. A DNS server implements the method 400. At step 410, a registration request comprising a domain name, a local address, and a scope is received. The registration request requests registration of the domain name. At step 420, an address is assigned to the domain name based on the local address and the scope. At step 430, a registration response comprising the address is generated. At step 440, the registration response is transmitted towards an endpoint.

The method 400 may implement additional embodiments. For instance, the domain name is a name of a website. The local address is an address of a web server that stores, processes, and delivers the website. The scope defines domains that can access the website. The scope is an address length. The address length is 24 bits, 16 bits, or 8 bits. The DNS server is in a domain, the endpoint is in a sub-domain of the domain, and the address comprises a domain address of the sub-domain. The DNS server is in a domain, the endpoint is in the domain, and the address comprises no domain address. The method further comprises caching a correspondence among the domain name, the address, and the scope.

Figure 5:
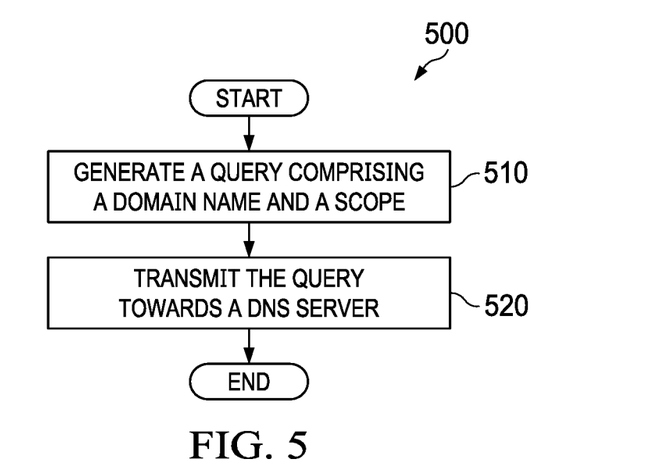
FIG. 5 is a flowchart illustrating a method of DNS querying.

FIG. 5 is a flowchart illustrating a method 500 of DNS querying. An endpoint implements the method 500. At step 510, a query comprising a domain name and a scope is generated. The domain name is a name of a website, the scope defines domains in which the query is valid, and the query requests an address corresponding to the domain name. At step 520, the query is transmitted towards a DNS server.

Figure 6:
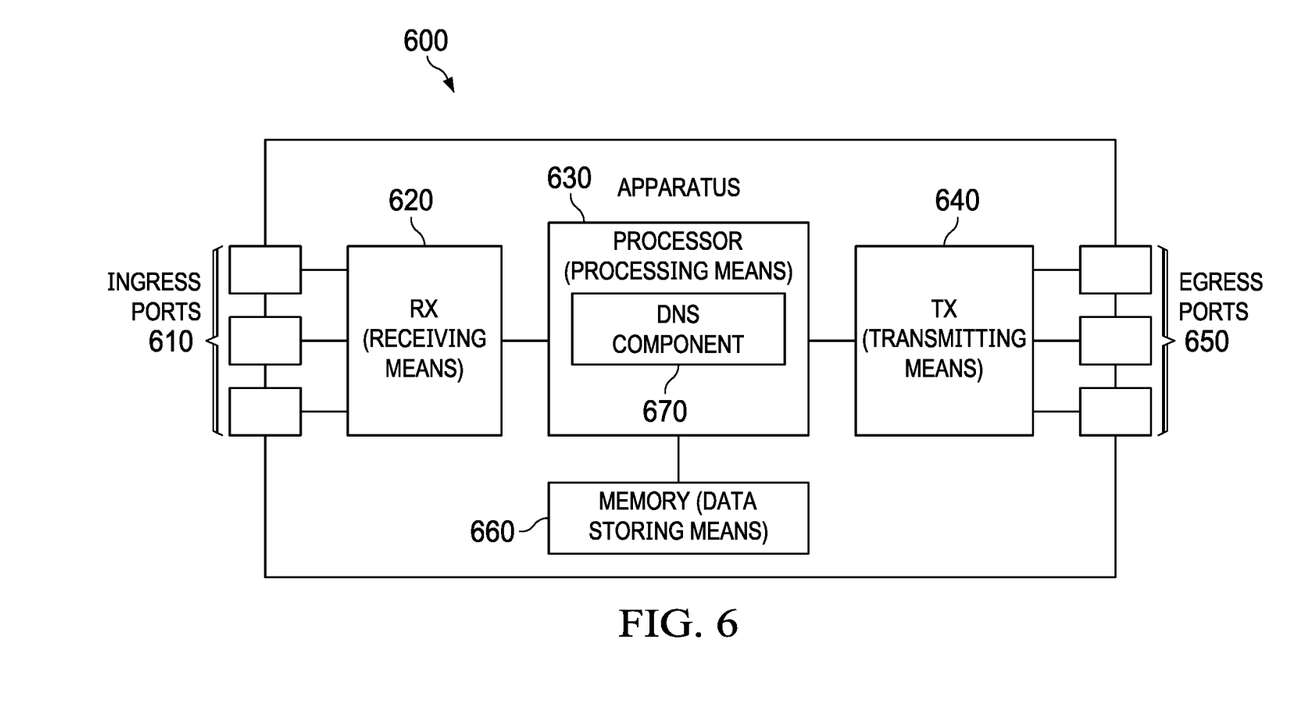
FIG. 6 is a schematic diagram of an apparatus according to an embodiment of the disclosure.

FIG. 6 is a schematic diagram of an apparatus 600 according to an embodiment of the disclosure. The apparatus 600 may implement the disclosed embodiments. The apparatus 600 comprises ingress ports 610 and an RX 620 or receiving means to receive data; a processor 630 or processing means, or logic unit, baseband unit, or CPU, to process the data; a TX 640 or transmitting means and egress ports 650 to transmit the data; and a memory 660 or data storing means to store the data. The apparatus 600 may also comprise OE components, EO components, or RF components coupled to the ingress ports 610, the RX 620, the TX 640, and the egress ports 650 to provide ingress or egress of optical signals, electrical signals, or RF signals.

The processor 630 is any combination of hardware, middleware, firmware, or software. The processor 630 comprises any combination of one or more CPU chips, cores, FPGAs, ASICs, or DSPs. The processor 630 communicates with the ingress ports 610, the RX 620, the TX 640, the egress ports 650, and the memory 660. The processor 630 comprises a DNS component 670, which implements the disclosed embodiments. The inclusion of the DNS component 670 therefore provides a substantial improvement to the functionality of the apparatus 600 and effects a transformation of the apparatus 600 to a different state. Alternatively, the memory 660 stores the DNS component 670 as instructions, and the processor 630 executes those instructions.

The memory 660 comprises any combination of disks, tape drives, or solid-state drives. The apparatus 600 may use the memory 660 as an over-flow data storage device to store programs when the apparatus 600 selects those programs for execution and to store instructions and data that the apparatus 600 reads during execution of those programs. The memory 660 may be volatile or non-volatile and may be any combination of ROM, RAM, TCAM, or SRAM.

A computer program product may comprise computer-executable instructions stored on a non-transitory medium and that, when executed by a processor, cause an apparatus to perform any of the embodiments. The non-transitory medium may be the memory 660, the processor may be the processor 630, and the apparatus may be the apparatus 600.

In an embodiment, a DNS server comprises a receiving means, a processing means coupled to the receiving means, and a transmitting means coupled to the processing means. The receiving means is configured to receive a registration request comprising a domain name, a local address, and a scope. The registration request requests registration of the domain name. The processing means is configured to execute computer instructions that cause the processing means to assign an address to the domain name based on the local address and the scope, and generate a registration response comprising the address. The transmitting means is configured to transmit the registration response towards an endpoint.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A Domain Name System (DNS) server comprising:
a memory configured to store instructions; and
a processor coupled to the memory and configured to execute the instructions to cause the DNS server to:
receive a registration request comprising a domain name, a local address, and a scope, the registration request requests registration of the domain name, the scope defines domains that can access a website, and the scope further defines the domains by autonomous system (AS) numbers;
assign an address to the domain name based on the local address and the scope;
generate a registration response comprising the address; and
transmit the registration response towards an endpoint.

2. The DNS server of claim 1, wherein the domain name is a name of the website.

3. The DNS server of claim 2, wherein the local address is of a web server that stores, processes, and delivers the website.

4. The DNS server of claim 1, wherein the scope is an address length.

5. The DNS server of claim 4, wherein the address length is 8 bits, 16 bits, or 24 bits.

6. The DNS server of claim 1, wherein the DNS server is in a domain, wherein the endpoint is in a sub-domain of the domain, and wherein the address comprises a domain address of the sub-domain.

7. The DNS server of claim 1, wherein the DNS server is in a domain, wherein the endpoint is in the domain, and wherein the address comprises no domain address.

8. The DNS server of claim 1, wherein the processor is further configured to execute the instructions to cause the DNS server to cache a correspondence among the domain name, the address, and the scope.

9. A method implemented by a Domain Name System (DNS) server and comprising:
receiving a registration request comprising a domain name, a local address, and a scope, the registration request requests registration of the domain name, the scope defines domains that can access a website, and the scope further defines the domains by autonomous system (AS) numbers;
assigning an address to the domain name based on the local address and the scope;
generating a registration response comprising the address; and
transmitting the registration response towards an endpoint.

10. The method of claim 9, wherein the domain name is a name of the website.

11. The method of claim 10, wherein the local address is of a web server that stores, processes, and delivers the website.

12. The method of claim 9, wherein the scope is an address length.

13. The method of claim 12, wherein the address length is 8 bits, 16 bits, or 24 bits.

14. The method of claim 9, wherein the DNS server is in a domain, wherein the endpoint is in a sub-domain of the domain, and wherein the address comprises a domain address of the sub-domain.

15. The method of claim 9, wherein the DNS server is in a domain, wherein the endpoint is in the domain, and wherein the address comprises no domain address.

16. The method of claim 9, further comprising caching a correspondence among the domain name, the address, and the scope.

17. A computer-readable medium storing instructions that, when executed by a processor, cause a Domain Name System (DNS) server to:
receive a registration request comprising a domain name, a local address, and a scope, the registration request requests registration of the domain name, the scope defines domains that can access a website, and the scope further defines the domains by autonomous system (AS) numbers;
assign an address to the domain name based on the local address and the scope;
generate a registration response comprising the address; and
transmit the registration response towards an endpoint.

18. The computer-readable medium of claim 17, wherein the scope is an address length.

19. A computer program product comprising instructions that are stored on a computer-readable medium and that, when executed by a processor, cause a Domain Name System (DNS) server to:
- receive a registration request comprising a domain name, a local address, and a scope, the registration request requests registration of the domain name, the scope defines domains that can access a website, and the scope further defines the domains by autonomous system (AS) numbers;
- assign an address to the domain name based on the local address and the scope;
- generate a registration response comprising the address; and
- transmit the registration response towards an endpoint.

20. The computer program product of claim 19, wherein the scope is an address length.

* * * * *